United States Patent [19]
Ayer

[11] 3,715,788
[45] Feb. 13, 1973

[54] ROTARY CUTTER WITH HELICAL BLADES

[75] Inventor: James C. Ayer, Rockford, Ill.

[73] Assignee: The Ingersoll Milling Machine Company, Rockford, Ill.

[22] Filed: March 1, 1971

[21] Appl. No.: 119,575

[52] U.S. Cl. .................................29/103 A, 29/105
[51] Int. Cl. ...............................................B26d 1/12
[58] Field of Search .....29/103, 105 R, 105 A, 103 A

[56] References Cited

UNITED STATES PATENTS 2,683,920  7/1954  Williams................................29/105

FOREIGN PATENTS OR APPLICATIONS 1,016,093  9/1957  Germany................................29/105

*Primary Examiner*—Harrison L. Hinson
*Attorney*—Wolfe, Hubbard, Leydig, Voit & Osann

[57] ABSTRACT

The cutter includes serrated helical blades detachably fastened by screws to a rotatable body with serrated, blade-receiving slots whose centerlines are offset from and preferably inclined relative to the rotational axis of the body to enable the blades to be located in the slots with the centerlines of the blades spaced from the axis while always keeping the serrations on the blades in precise mating engagement with the serrations in the slots.

22 Claims, 27 Drawing Figures

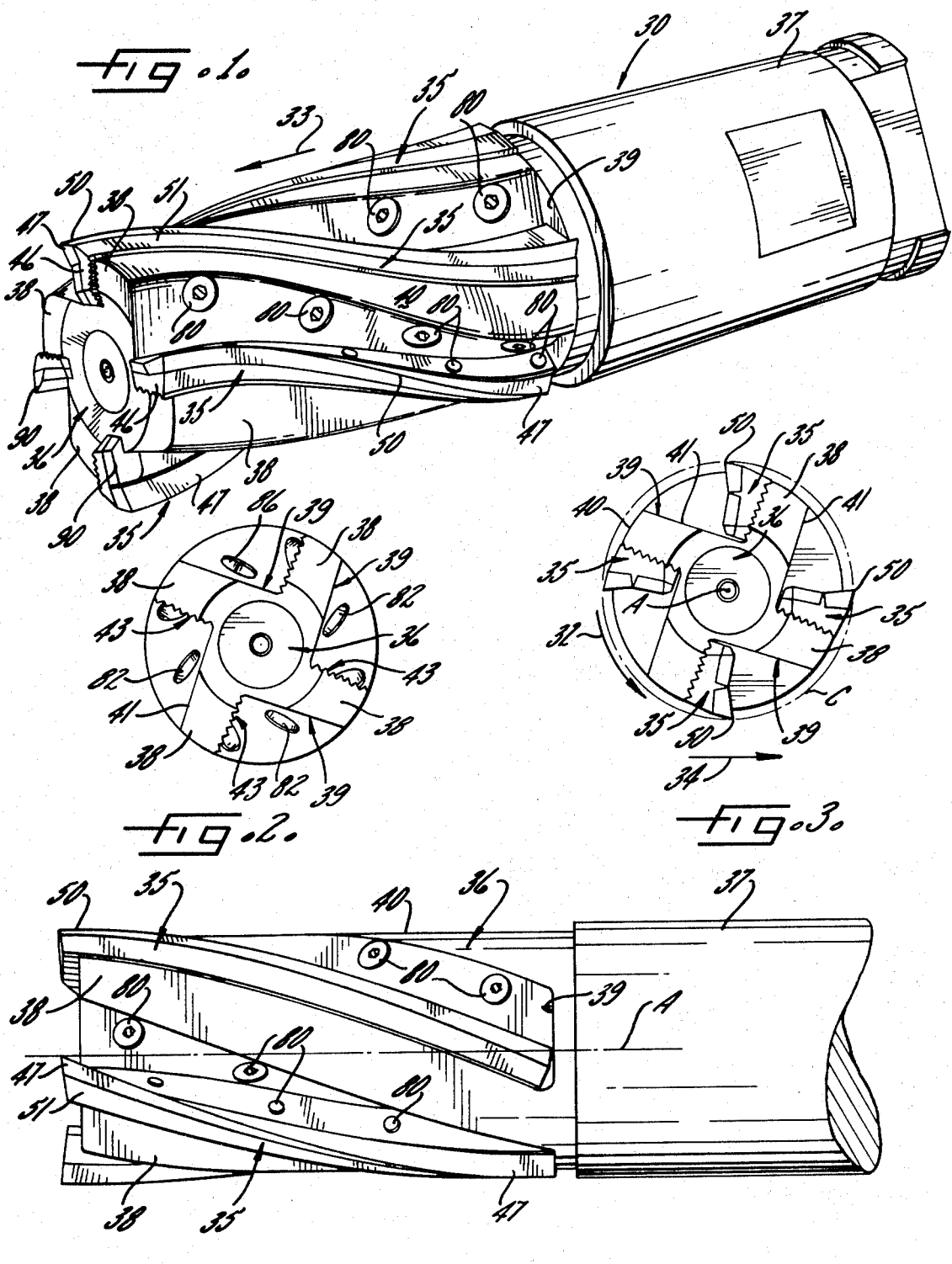

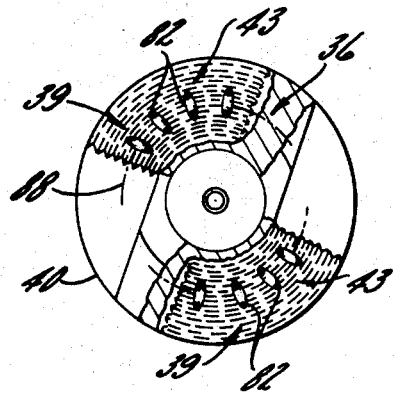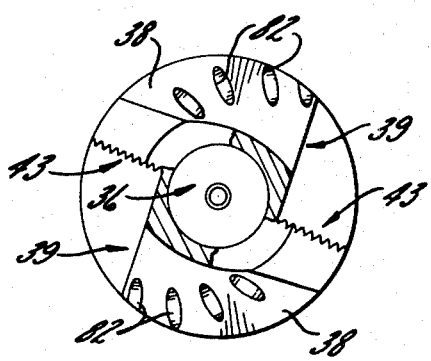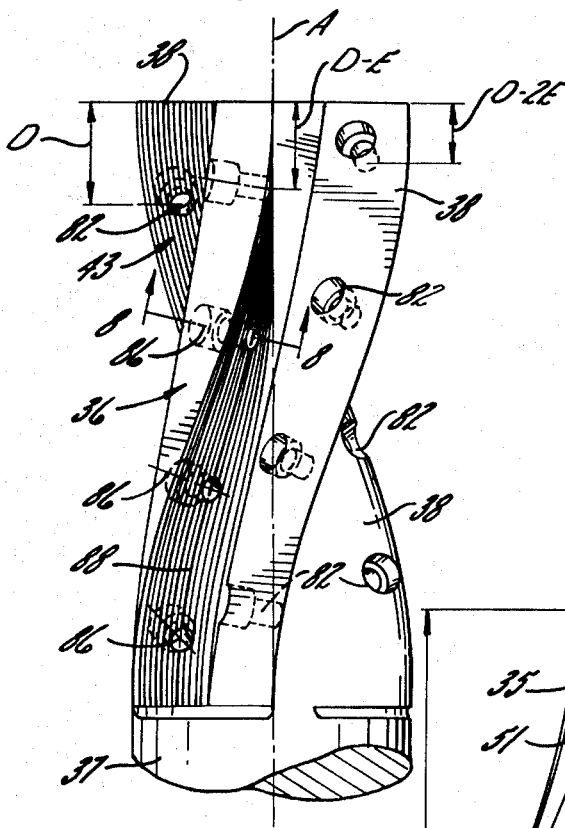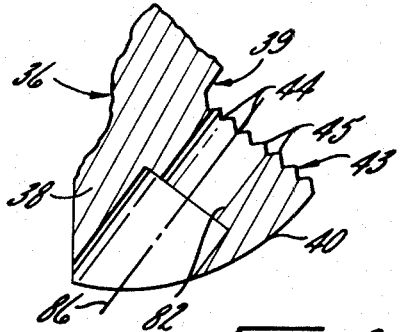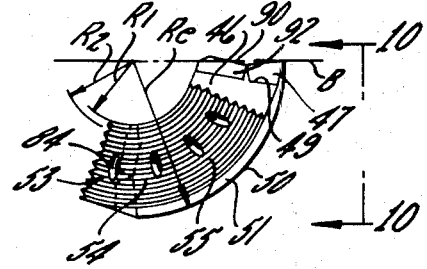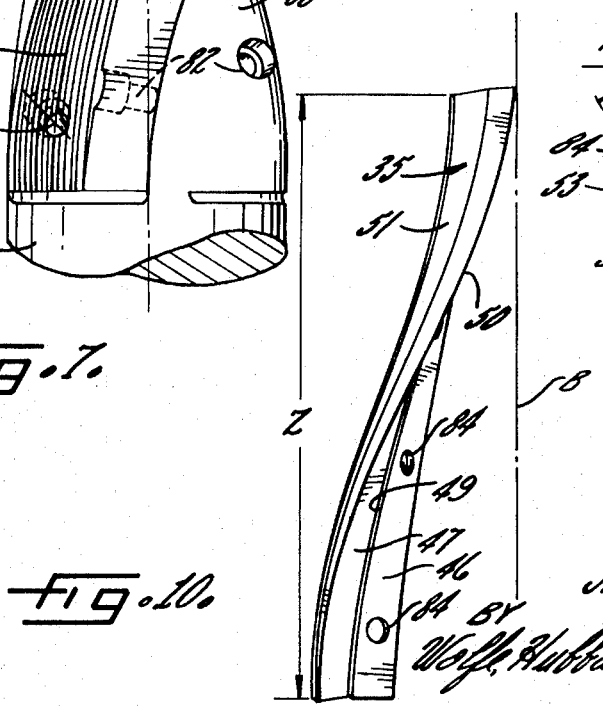

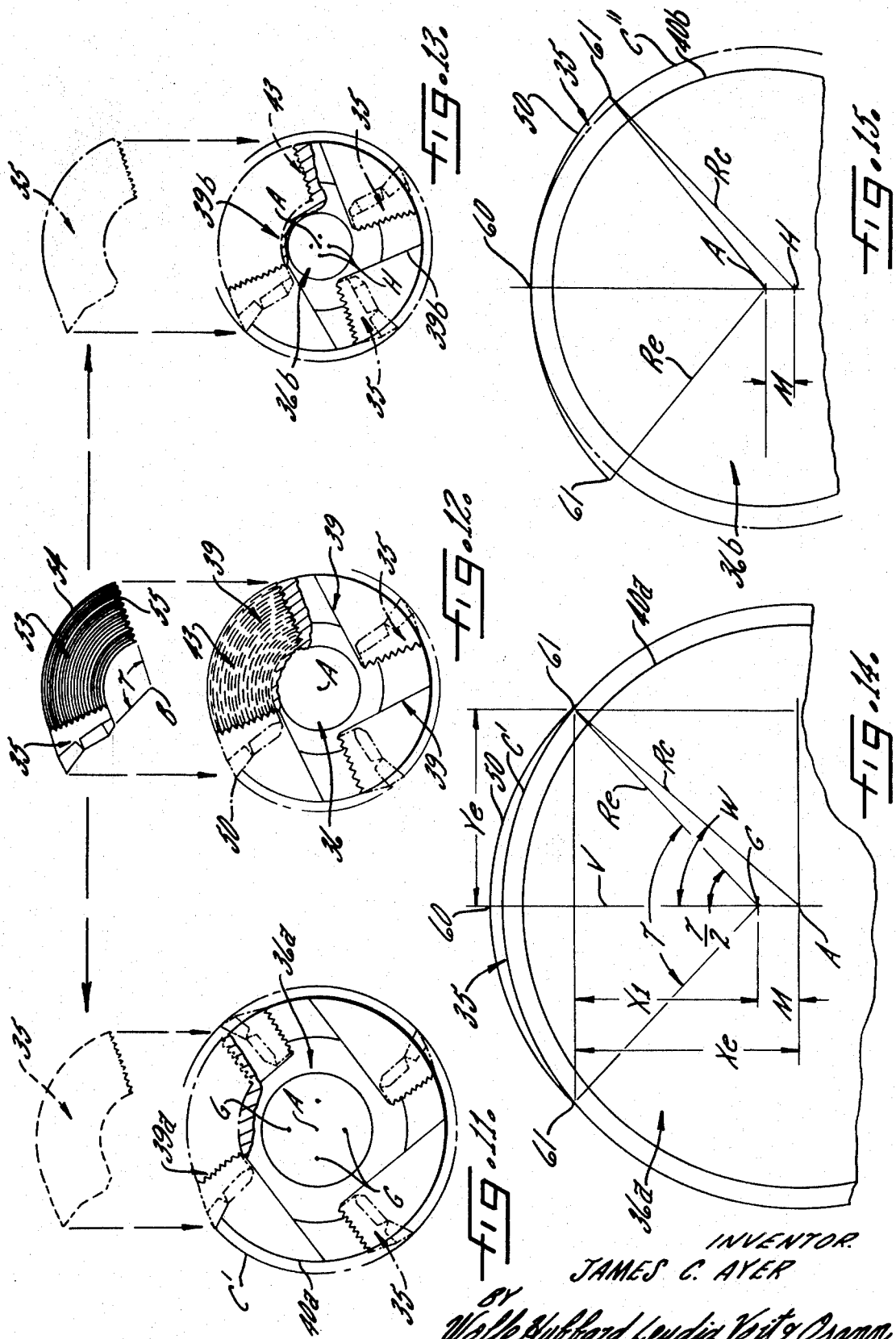

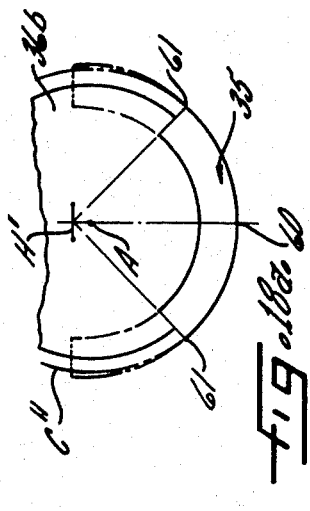
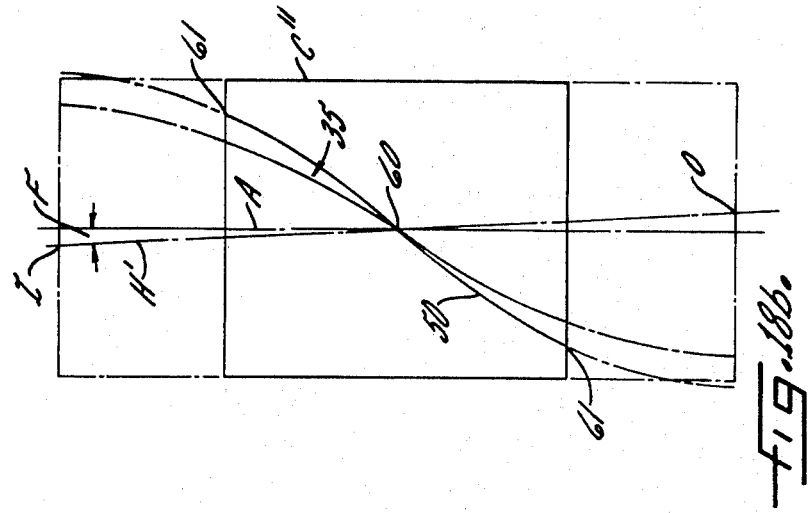
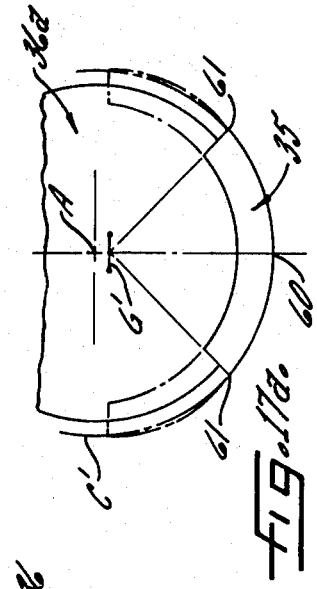
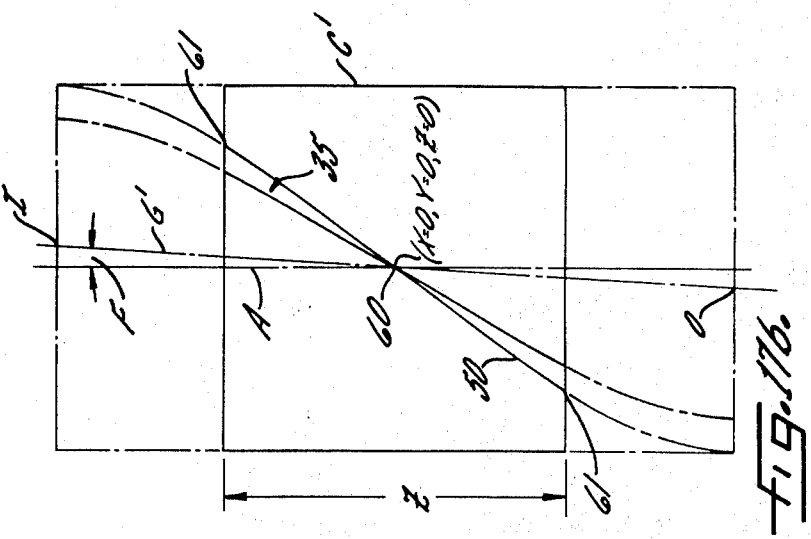
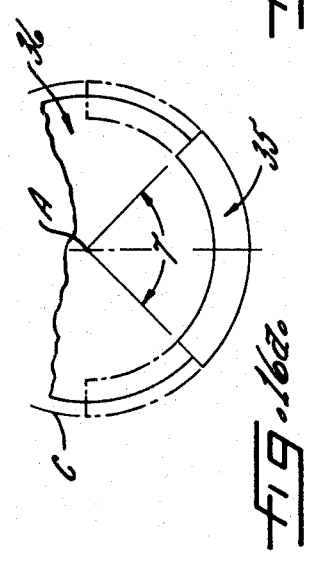
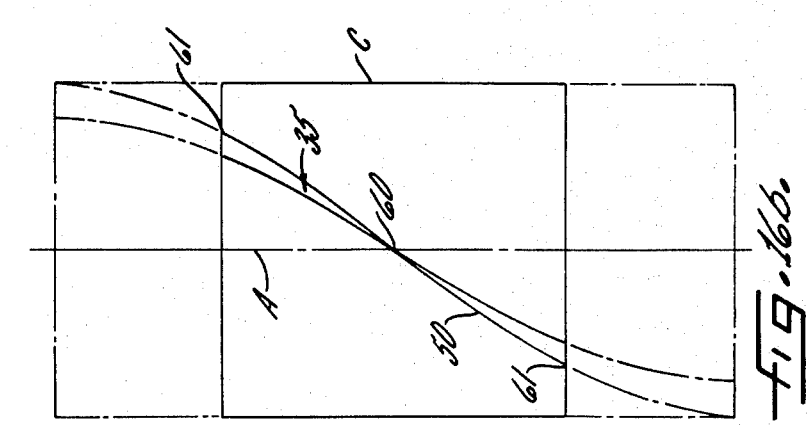

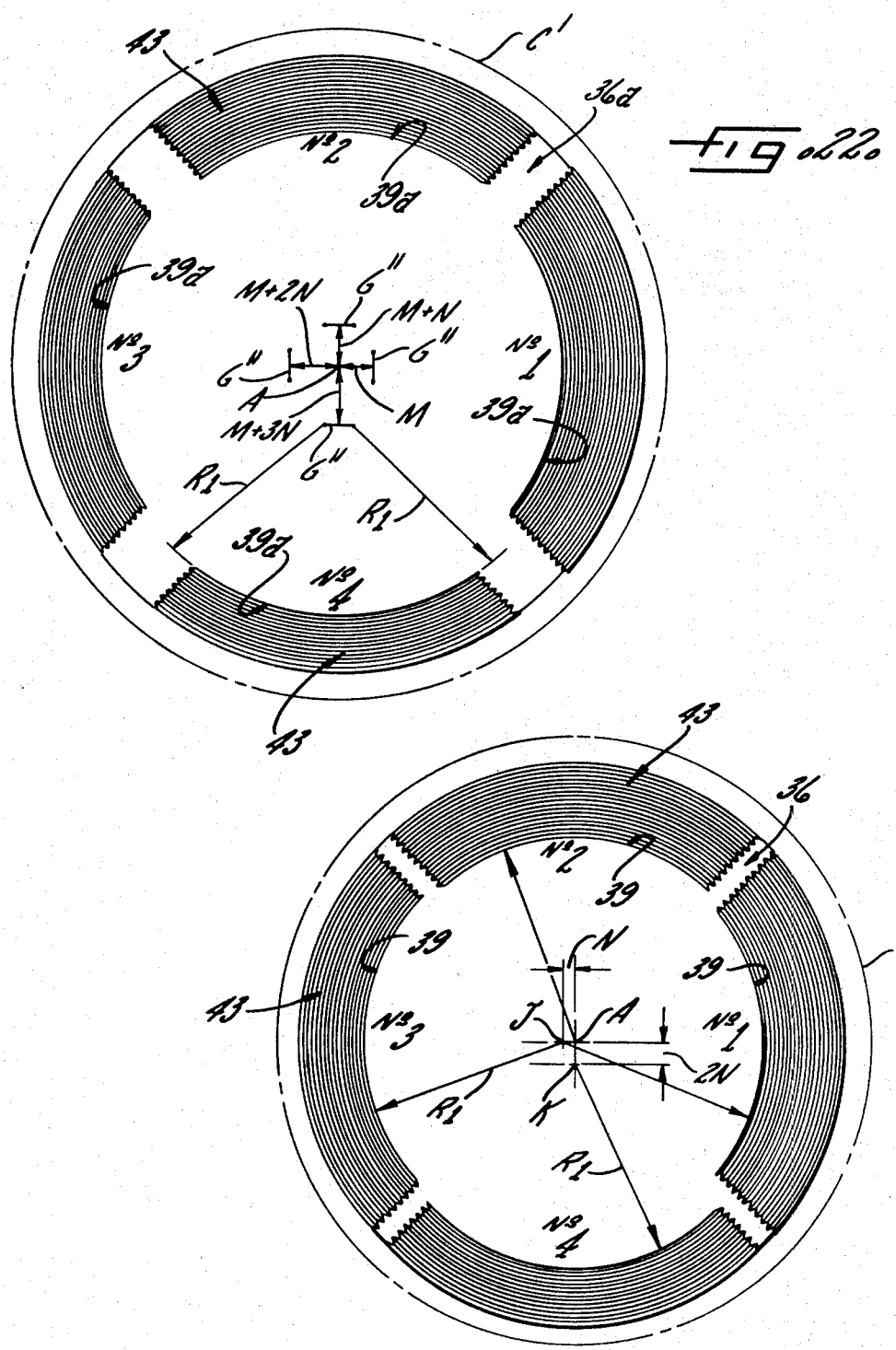

ROTARY CUTTER WITH HELICAL BLADES

BACKGROUND OF THE INVENTION

This invention relates to rotary cutters and, more particularly, to cutters of the type having helical blades which are seated detachably in angularly spaced slots in a rotatable body and which include cutting edges set out a selected distance from the body so as to lie upon and describe a cutting cylinder of predetermined diameter. Frequently, the sides of the blades are formed with a series of serrations which intermesh with complementary serrations on the side walls of the slots in order to help locate the blades in fixed transaxial positions relative to the cutter body.

SUMMARY OF THE INVENTION

The primary aim of the present invention is to reduce the number of different sizes of helical blades necessary to manufacture and stock in order to supply helical cutters of different cutting diameters within a given range of diameters.

A related object is to make helical blades of a given size usable universally with cutters of selected different diameters while keeping the locating serrations on the blades in precise meshing engagement with the serrations of the slots of the cutter body regardless of the diameter of the cutter.

A further object is to provide a helical cutter whose blades may be indexed from slot to slot and set out progressively greater distances from the rotational axis of the cutter, the slots of the cutter body being uniquely formed to avoid any mismatch between the serrations of the blades and the serrations of the slots when the blades are placed in different slots.

A more detailed object is to achieve the foregoing ends by forming the slots about centerlines which are non-coincident with the rotational axis of the cutter and which are offset from and preferably inclined relative to the rotational axis. A correlated object is to form each slot about a centerline which coincides with the centerline of the associated blade and whose location is dictated by the position of the centerline of the blade rather than by the rotational axis of the cutter.

The invention also resides in the novel attachment of the helical blades to the cutter body with simplified fasteners such as threaded screws which serve to hold the blades rigidly in fixed longitudinal positions as well as fixed transaxial positions.

These and other objects of the invention will become more apparent from the following detailed description when taken in conjunction with the accompanying drawings.

BRIEF DESCRIPTION OF THE DRAWINGS

FIG. 1 is a perspective view of a helical cutter embodying certain features of the present invention, the cutter body being of standard size with respect to the blades of the cutter.

FIG. 2 is an end view of the cutter illustrated in FIG. 1 but showing the blades removed from the body.

FIG. 3 is an end view similar to FIG. 2 but showing the blades attached to the body.

FIG. 4 is a fragmentary plan view of the cutter shown in FIG. 1.

FIG. 5 is a view looking into the end of the cutter and along the serrated sides of the slots, two of the flutes of the cutter body being broken away for purposes of clarity.

FIG. 6 is an end view similar to FIG. 2 but with two of the flutes of the cutter body broken away.

FIG. 7 is a plan view similar to FIG. 4 but showing the cutter with the blades removed from the body.

FIG. 8 is an enlarged fragmentary cross-section taken substantially along the line 8—8 of FIG. 7.

FIG. 9 is an end view of one of the blades.

FIG. 10 is a top plan view of the blade shown in FIG. 9 and is taken along the line 10—10 of FIG. 9.

FIGS. 11, 12 and 13 are schematic end views of large, standard and small diameter cutters, respectively, and showing the use of cutter bodies of different sizes with blades of a single size.

FIG. 14 is a diagrammatic view illustrating the use of the blades with a large cutter body whose slots are formed about centerlines which parallel the rotational axis of the body.

FIG. 15 is a view similar to FIG. 14 but showing the use of the blades with a small cutter body whose slots are formed about centerlines which parallel the rotational axis of the body.

FIGS. 16a and 16b are diagrammatic end and plan views, respectively, showing the use of the blades with a standard diameter cutter body whose slots are formed about centerlines which coincide with the rotational axis of the body.

FIGS. 17a and 17b are views similar to FIGS. 16a and 16b but show the use of the blades with a large cutter body whose slots are formed about centerlines which are offset from and inclined relative to the rotational axis of the body.

FIGS. 18a and 18b are views similar to FIGS. 16a and 16b but show the use of the blades with a small cutter body whose slots are formed about centerlines which are offset from and inclined relative to the rotational axis of the body.

FIG. 22 is a diagrammatic view illustrating a large cutter body whose slots are formed about offset and inclined centerlines and are arranged to cause progressive set out of the blades as the latter are indexed from slot to slot.

FIG. 23 is a diagrammatic view illustrating a standard diameter cutter body whose slots are arranged to cause progressive set out of the blades as the latter are indexed from slot to slot.

DETAILED DESCRIPTION OF THE PREFERRED EMBODIMENTS

Figure 19:
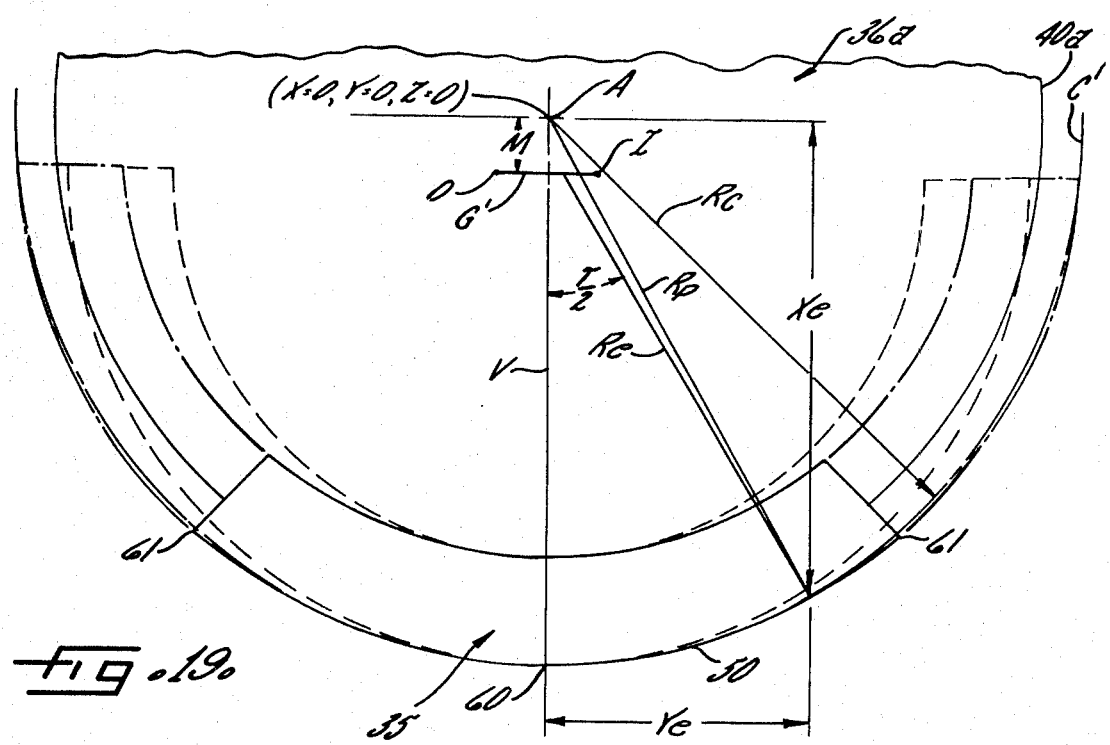
FIG. 19 is a diagrammatic view similar to FIG. 17a but on a greatly enlarged scale.

A. The Basic Construction of a Helical Cutter

While the principles of the invention are applicable to various types of cutters, reference herein is made to a so-called end milling cutter 30 (FIGS. 1 and 3) rotatable about a central axis A in the direction of the arrow 32 and adapted to be moved endwise or axially toward a workpiece (not shown) in the direction of the arrow 33 and then fed radially as indicated by the arrow 34 so as to remove successive layers of metal from the workpiece. The cutter 30 which has been illustrated is commonly called a helical end mill in that the cutting blades 35 extend helically around and along the axis A.

More specifically, the cutter 30 includes a cylindrical metal body 36 with a mounting shank 37 at its inner end and formed with four angularly spaced flutes 38 defining four intervening slots 39 which open out of both the outer end of the body and the peripheral surface 40 thereof, the slots being formed with a generally V-shaped cross-section. The cutting blades 35 are received in the slots and, in this particular instance, a single blade is shown as being located within each slot although it should be appreciated that it is common practice to place two or more blades end-to-end in each slot.

Each blade 35 is located closely adjacent a portion of the bottom wall 41 (FIGS. 2 and 3) of the associated slot 39 and is seated detachably against the adjacent side wall of the slot, the bottom wall being defined by the trailing side of one of the flutes 38 and the side wall being defined by the leading side of the immediately following flute. To help hold the blade in a predetermined transaxial (i.e., radial or generally radial) position relative to the cutter body 36, the side wall of each slot includes a locating seat which preferably but not necessarily takes the form of a series of serrations 43 (FIG. 8) defined by a number of equally spaced grooves 44 and ribs 45 alternating with one another outwardly across the side wall and milled in the side wall after cutting of the slot. The side of each slot opposite the serrated side wall is open so as to leave the workpiece chips free to fly away from the body 36 across the bottom wall 41 of the slot.

All four blades 35 for the cutter 30 are identical to one another and each comprises a holder 46 (FIGS. 9 and 10) suitably cast or machined from a metal such as alloy steel and supporting and backing a tip 47 of high speed cutting material such as tungsten carbide. Each tip is seated within a notch 49 formed along the leading side of the respective holder, is brazed rigidly to the holder, and includes a sharply ground main cutting edge 50 extending along the outer face 51 of the holder. For the most part, the tip 47 simply forms a high speed cutting edge on the holder 46 and, for purposes of further discussion, the tip and the holder may be considered as a single unit which constitutes the blade 35.

As shown in FIGS. 9 and 12, the trailing side of each blade 35 is formed with a locator which coacts with the seat or serrations 43 of the associated slot 39 to hold the blade in a predetermined transaxial position in the slot. In this instance, the locator comprises a series of serrations 53 defined by equally spaced ribs 54 and intervening grooves 55 alternating with one another outwardly across the trailing side of the blade and adapted to intermesh with the grooves 44 and ribs 45 in the slot to locate the blade in a fixed transaxial position in the slot and thereby establish the extent of projection or set out of the cutting edge 50 from the peripheral surface 40 of the cutter body 36. The innermost serration on each blade is a rib 54 while the innermost serration in each slot is a groove 44 and thus the ribs and the grooves on the blade are staggered with respect to the ribs and the grooves in the slot to enable the various ribs and grooves to intermesh in such a manner as to locate the inner face of the blade closely adjacent the bottom 41 of the slot (see FIG. 3).

As pointed out above, each of the blades 35 is helically shaped (herein, with a right hand helix) and thus has a twisted configuration as opposed to being flat. Accordingly, the inner and outer faces of the blade curve helically around and along the axis A while the leading and trailing sides of the blade each define a helical surface of the type which would be generated if a line extending at right angles to the axis A were revolved about the axis and translated along the axis at a uniform rate. In order to fully appreciate the principles of the invention, it is necessary to understand that, as initially formed, each blade has a definite centerline B (FIGS. 9 and 10) along and about which all of the helices of the blade are curved. Thus, the innermost rib 54 of the serrations 53 of the blade is curved helically about the centerline B on a radius $R_1$ (FIG. 9), the innermost groove 55 of the serrations 53 is curved helically about the same centerline and at the same lead but on a larger radius $R_2$, and the remaining progressively outwardly located ribs and grooves are concentric with their innermost counterparts and are all curved helically about the same centerline and on progressively larger radii. The cutting edge 50 is curved on the largest radius $R_e$ of the blade and also is curved helically about the same centerline B. By way of example only and for purposes of further discussion, it may be assumed that the radius $R_e$ of the cutting edge 50 of the illustrated blade is 1-⅛ inches and thus, when the blade is positioned with its centerline lying on the axis A, the cutting edge of the blade lies on a cutting cylinder C (FIG. 3) whose diameter is 2-¼ inches. Also, the present blade is curved helically with an axial lead L of 16 inches —meaning that the blade would extend along the centerline B through an axial distance of 16 inches before curving 360° around the centerline. Finally, the axial face length Z (FIG. 10) between the ends of the blade is 4 inches so that the blade actually subtends or wraps around an angle T (FIG. 12) of 90 degrees where T is the angle measured from the centerline of the blade and extending between the two ends of the blade and may be expressed in terms of degrees as:

$$T = Z(360°)/L \qquad (1)$$

or in terms of radians as:

$$T = (Z\,2\pi)/L \qquad (2)$$

The body 36 of the cutter 30 shown in FIGS. 1 to 8 has a nominal outside diameter of 2-¼ inches and thus the nominal diameter of the cutter body corresponds with the diameter of the cylinder C described by the cutting edges 50 of the blades 35 as the latter are rotated. In actuality, the outside diameter of the body is somewhat smaller than 2¼ inches and, when the blades are fitted into the slots 39, the cutting edges 50 lie on the cutting cylinder C with a true diameter of 2¼ inches (or radius $R_c$ of 1⅛ inches) and always project outwardly a very slight distance from the peripheral surface 40 of the body as shown in FIG. 3 so as to provide transaxial clearance between the body and the cutting cylinder.

In most instances, each blade 35 is seated in its respective slot 39 with the innermost rib 54 of the blade fitted into the innermost groove 44 in the slot and with the remaining serrations 53 on the blade interfitting precisely with the rest of the serrations 43 in the slot. To achieve such a matching relationship between the serrations 43 and 53 and to make the cutting edge 50 (with a radius $R_e$ of 1⅛ inches) lie on the 2¼ inches cutting cylinder C, each blade is fitted in the associated slot with the centerline B of the blade coinciding exactly with the longitudinal centerline or rotational axis A of the body 36. In addition, the slot itself is curved helically about a centerline which also coincides with the rotational axis A, and is formed by moving a milling cutter (not shown) along the body 36 while rotating the body about its axis. Thus, in the example given, the innermost groove 44 in the slot 39 is curved helically about the axis A with a lead of 16 inches and on a radius which corresponds to the radius $R_1$ of the innermost rib 54 of the blade 35, the innermost rib 45 in the slot is concentric with the groove 44 but is curved on a larger radius equal to the radius $R_2$ of the innermost groove 55 of the blade, and the remaining grooves 44 and the ribs 45 of the slot are concentric with and spaced equally from one another and are curved helically about the axis A and on progressively larger radii as they progress outwardly across the side wall of the slot. In addition, the extreme outer edge of the side wall of each slot is curved on a radius just less than the radius $R_e$ of the cutting edge 50 of the blade. As a result, the serrated side wall of the slot is formed as a helical surface which is a mirror image of the helical surface defined by the trailing side of the blade except, of course, for the staggered relationship of the ribs and grooves on the side wall with respect to the ribs and the grooves on the blade. Because each helical serration of the slot is thus curved about the axis A and on the same radius as the corresponding serration of the blade, the blade may be fitted into the slot with its serrations 53 in precise meshing engagement with the serrations 43 in the slot and with its cutting edge 50 set out slightly from the peripheral surface 40 of the body 36 and lying on the 2¼ inches cutting cylinder C. Since such a relationship is achieved with the centerline B of the blade located on the axis A of the body, the blade and the body may be said to be specifically matched to one another, i.e., the diameter of the blade is the same as the nominal diameter of the body.

B. The Invention In General

The present invention is based upon my discovery that, by forming the blade slots about centerlines which are non-coincident with the rotational axis A of the cutter body, helical blades 35 of a given diameter may be used effectively in conjunction with cutter bodies 36a and 36b (FIGS. 11 and 13) having diameters which are larger or smaller than the diameter of the body 36 to which the blades are specifically matched and the blades can be made to lie on larger or smaller cutting cylinders while still keeping the serrations on the blades in precise mating engagement with the serrations in the slots. As a result, the same blades may be used universally with bodies having different diameters within a given range of diameters so as to reduce the number of blades necessary to manufacture and keep in stock to produce differently sized cutters and, at the same time, the blades may be used with custom made bodies of odd diameters within the range so as to avoid the need for manufacturing odd diameter blades to fit such bodies.

C. Offsetting of the Slot Centerlines

As the first step in carrying out and explaining the invention and with reference to the large cutter body 36a (FIGS. 11 and 14), the slots 39a are shown to be formed in such body such that their centerlines G lie along lines which are offset radially from and extend parallel to the rotational axis A. Let it be assumed for exemplary purposes that the large body 36a has a nominal outside diameter of 2½ inches or a radius of 1¼ inches and that is is desired to use the blades 35 (with a cutting edge radius $R_e$ of 1⅛ inches) in conjunction with such body and to make the cutting edge 50 of each blade project just beyond the peripheral surface 40a of the body and lie on a cutting cylinder C' with a true radius $R_c$ (FIG. 14) of 1¼ inches. In such an instance, all of the helices of each slot in the large body 36a are formed on the same radius as the corresponding helices of the slot in the standard sized 2¼ inches body 36 but, instead of being curved about the rotational axis A of the large body, are curved about the centerline G (FIG. 14) which herein parallels the axis and which is offset from the axis by a predetermined distance M along a line intersecting the axis and coinciding with the bisector V of the wrap-around angle T. As a result, the innermost groove 44 in the slot of the large body 36a has the same radius $R_1$ as the innermost groove in the standard body 36, the innermost rib 45 in the slot of the large body has the same radius $R_2$, and the other grooves and ribs in the large body have the same radii as the corresponding grooves and ribs in the standard body. The centerline G of the slot 39a is offset from the axis A in a positive direction (i.e., toward the side of the body in which the slot is formed) and thus the spacing between the axis A and the various serrations 43 of the large body 36a is greater than the spacing between the axis and the corresponding serrations of the standard body 36. Accordingly, when one of the blades 35 is placed in one of the slots 39a in the large body, the cutting edge 50 is set out further from the axis and yet, at the same time, the serrations on the blade mate precisely with the serrations in the slot— and without any mismatch between the serrations as otherwise would be the case if each slot in the large cutter body were actually formed about the rotational axis and on a radius sufficient to set the cutting edge out a corresponding distance from the axis.

It will be seen in FIG. 14 that, when one of the blades 35 is seated in one of the slots 39a in the large body 36a, the cutting edge 50 of the blade initially projects outwardly from the 2½ inches cutting cylinder C' a greater distance at the lengthwise midpoint 60 of the blade than at the ends 61 of the blade. Also, the extent of projection of the cutting edge 50 from the cutting cylinder C' decreases progressively as the cutting edge proceeds from the lengthwise midpoint of the blade to each end thereof. This variance in the extent of projection occurs as a result of superimposing the blade with a cutting edge 50 of a given radius onto the cutting cylinder C' of a larger radius and, because of the variance, it is necessary to grind off the midportion of the blade a certain amount so as to make all of the points along the cutting edge lie on and conform to the cutting cylinder and thus project outwardly an equal distance from the peripheral surface 40 of the body 36a. Of course, the amount of stock which must be ground from the blade decreases progressively from the midpoint 60 of the blade to each end 61 thereof.

To make the cutting edge 50 of each blade 35 effective along its entire length when the blade is fitted into a larger body 36a than that to which the blade is matched specifically, it is necessary that the centerline G of each slot 39a in the large body be offset from the rotational axis A of the body by a sufficiently large distance M to at least set the cutting edge at the ends 61 of the blade on the 2½ inches cutting cylinder C'. In other words, if the offset distance M should be below a predetermined value, the cutting edge at the ends of the blade would be located inwardly of the cutting cylinder C' and would not be effective to cut into the workpiece. On the other hand, it is undesirable for the cutting edge 50 at the ends of the blade to initially project any substantial distance outwardly from the cutting cylinder C' because this would result in the need to grind an excessively large amount of material from the ends of the blade in order to make the ends coincide with the cutting cylinder and also would increase the amount of stock necessary to grind from the midportion of the blade. It is possible to determine an optimum value for the offset distance M to make the ends of the cutting edge of any given blade lie directly on a given cutting cylinder with a larger radius than the blade.

In order to explain the manner of making such a determination, reference is made to FIG. 14 which shows an unground blade 35 having a radius $R_e$ of 1⅛ inches at its cutting edge and fitted into a large body 36a with a nominal radius of 1¼ inches at its peripheral surface 40a, it being desired to make the cutting edge lie on a large cutting cylinder C' with a true radius $R_c$ of 1¼ inches. From FIG. 14, it will be seen that the following factors are known:

a. The radius ($R_e$ = 1⅛ inches) of the cutting edge 50 of the blade 35 at one end 61 of the blade as measured from the centerline G of the slot 39a (which centerline coincides with the centerline B of the blade);

b. The radius ($R_c$ = 1¼ inches) of the cutting cylinder C' as measured from the rotational axis A of the body 36a;

c. The wrap around angle (T = 90°) subtended by the cutting edge 50 of the blade 35; and d. The angle (T/2 = 45°) subtended by the cutting edge 50 of the blade 35 from the midpoint 60 of the blade to one end 61 thereof.

Now, the distance $Y_e$ from one end 61 of the cutting edge 50 to the bisector V of the angle T may be expressed as;

$$Y_e = R_e \sin(T/2) \qquad (3)$$

$$= 1\tfrac{1}{8}''(\sin 45°)$$
$$= 0.795''$$

And thus, the angle W subtended across the cutting cylinder C' by the cutting edge 50 from the midpoint 60 to one end 61 of the blade may be determined by the following equation:

$$W = \sin^{-1}(Y_e/R_c) \qquad (4)$$
$$= \sin^{-1}(.795''/1.25'')$$
$$= 39.5°$$

Also, the distance $X_e$ from the axis A of the body 36a to one end 61 of the cutting edge 50 may be expressed as:

$$X_e = R_c \cos W \qquad (5)$$
$$= 1\tfrac{1}{4}'' \cos 39.5°$$
$$= 0.965''$$

And, the distance $X_1$ from the centerline G of the slot 39a to one end 61 of the cutting edge 50 is:

$$X_1 = R_e \cos(T/2) \qquad (6)$$
$$= 1\text{-}\tfrac{1}{8}'' \cos 45°$$
$$= 0.795''$$

Now, the offset distance M may be expressed as:

$$M = X_e - X_1 \qquad (7)$$
$$= 0.965'' - 0.795''$$
$$0.170''$$

Accordingly, when the centerline G of the slot 39a is offset a distance M of 0.170 inch toward the surface of the body in which the slot is to be formed and along the bisector V of the angle T subtended by the cutting edge 50, the blade 35 may be fitted into the large body 36a with the serrations 53 of the blade in precise meshing engagement with the serrations 43 in the slot and with the cutting edge at the ends 61 of the blade lying precisely on the 2½ inches cutting cylinder C' as shown in FIG. 14. Thus, it is not necessary to grind any material off of the extreme ends of the cutting edge and, in order to make the entire cutting edge lie on the cutting cylinder C', 0.045 inch of material is ground from the midpoint 60 of the blade and progressively decreasing amounts of material are removed as the grinding proceeds towards the ends of the blade.

As mentioned earlier, it also is possible to use the same blades 35 in conjunction with a body 36b (FIGS. 13 and 15) which is smaller than the body 36 to which the blades are matched specifically. This is achieved by forming each slot 339b in the small body 36b about a centerline H (FIG. 15) which is offset from the cutter axis A by a predetermined distance M in a negative direction, that is, in a direction away from the side of the body in which the slot is to be formed rather than being offset from the axis in a direction toward such side as in the case of the centerline G of each slot in the large body 36a.

To explain the foregoing in more detail, let it be assumed that the small body 36b (FIG. 15) has a nominal outside diameter of 2 inches or a radius of 1 inch and that it is desired to use the blades 35 (with a cutting edge radius $R_e$ of 1-⅛ inch) in conjunction with the small body and to make the cutting edge of each blade lie on a cutting cylinder C'' with a true radius $R_c$ of 1 inch. Let it further be assumed that the centerline H of each slot 39b in the small body 36b is to parallel the rotational axis A of the body. As before, all of the helices of each slot in the small body 36b are curved on the same radius as the corresponding helices of the slot in the standard body 36 so that the radii of corresponding grooves 44 and ribs 45 in the slots in the small and standard bodies are equal. As pointed out above, however, the ribs and grooves of the slot in the small body 36b are not curved about the rotational axis A of the body but, instead, are curved about the centerline H (FIG. 15), the latter being offset from the axis by a negative distance M and away from the side of the body in which the slot is formed. Offsetting of the centerline H in such a manner enables the cutting edge 50 to approximate the 2 inch cutting cylinder C'' of the small body 36b while still achieving a precise mating relationship between the serrations 53 on the blade and the serrations 43 in the slot.

Now, when an unground blade 35 is placed in one of the slots 39b in the small body 36b, the cutting edge 50 at the midpoint 60 of the blade lies on the cutting cylinder C'' (see FIG. 15) while the cutting edge at the ends 61 of the blade projects outwardly from the cylinder. The variance in the projection of the cutting edge occurs as a result of superimposing a blade of a given radius onto a cutting cylinder of a smaller radius and, because of the variance, it is necessary to grind off the blade at its ends 61 and to a grind progressively decreasing amount of stock from the blade as the cutting edge proceeds from the ends to the midpoint 60 of the blade.

To avoid needless grinding of the blades 35, it is desirable to offset each slot 39b of the small body 36b a distance M (FIG. 15) which is no greater than is necessary to locate the midpoint 60 of the blade on the cutting cylinder C''. In the case of fitting the blade 35 into the small body 36b, the optimum offset distance M is simply equal to the difference between the radius $R_e$ of the cutting edge 50 and the radius $R_c$ of the cutting cylinder C'' or, in the specific example given, is equal to one-eighth inch. With the centerline H offset from the axis A by such a distance, the midpoint 60 of the blade lies precisely on the cutting cylinder C'' and the entire cutting edge may be made to lie on the cylinder by grinding 0.045 inch of material from each end 61 of the blade and by removing progressively decreasing amounts of material from the blade as the cutting edge proceeds toward the midpoint.

From the foregoing, it will be apparent that, by offsetting the centerlines of the blade slots relative to the rotational axis A of the associated cutter body so that the centerlines parallel the axis, blades 35 of a given diameter may be used with bodies of a larger or smaller diameter while still keeping the serrations 53 on the blades in mating engagement with the serrations 43 in the slots. In instances, however, where the amount of offset M relative to the major radius $R_e$ of the blade is comparatively large or where the axial face length Z of the blade is greater than about one-fourth of the lead L, parallel offsetting of the centerlines creates an undesirably large variation between the grinding stock which must be removed at the midpoint 60 of the blade and the grinding stock which must be removed at the ends 61 of the blade in order to make the entire cutting edge 50 lie on the cutting cylinder.

D. Inclining of the Slot Centerlines

I have further discovered that the variation in the grinding stock between the midpoint 60 and the ends 61 of the blade 35 can be reduced significantly by forming each slot about a centerline which does not parallel the rotational axis A of the body but which instead is inclined relative to the axis. Thus, to achieve optimum results, the centerline of each slot in the large and small bodies 36a and 36b should be offset equidistantly from the axis A at all points along the length of the centerline and, in addition, should be tilted at a predetermined angle relative to a plane which contains both the axis and the bisector V of the wrap-around angle T.

Tilting of the slot centerline in such a manner relative to the axis A of the body causes the cutting edge 50 to more nearly approximate the radius of the cutting cylinder along the entire length of the cutting edge so as to reduce the variation in grinding stock between the midpoint and the ends of the blade. Stated differently, tilting of the slot centerline has the effect of leaving the midpoint 60 of the cutting edge 50 in the same position relative to the cutting cylinder that such midpoint would occupy if the centerline were not tilted. The tilting does, however, cause the cutting edge at the ends 61 of the blade to move inwardly or outwardly of the cylinder, depending upon the direction of tilt, and results in a decrease in the variation between the extent of projection of the cutting edge from the cutting cylinder at the midpoint of the blade and the extent of projection at the ends thereof. Thus, when an unground blade 35 is placed in a slot whose centerline is inclined relative to the rotational axis A, the cutting edge 50 appears as a partial ellipse when viewed from one end of the cutter body rather than appearing as a circular arc as is the case when the centerline of the slot parallels the axis.

Figure 20:
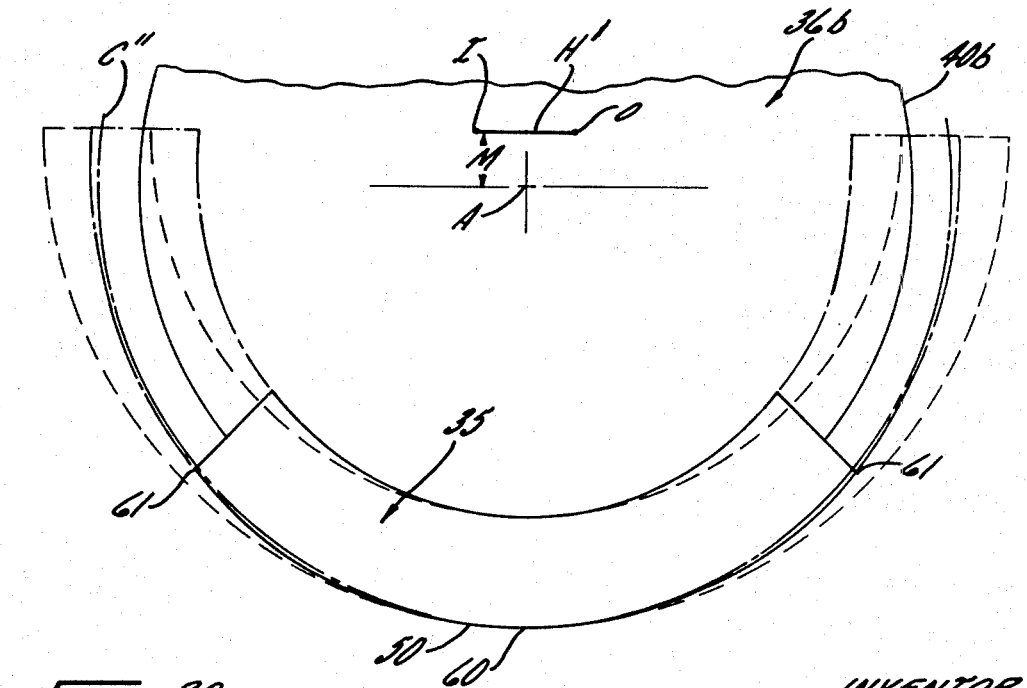
FIG. 20 is a diagrammatic view similar to FIG. 18a but on a greatly enlarged scale.

FIGS. 17a, 17b and 19 diagrammatically illustrate an unground blade 35 placed in a large body 36a having a slot 39a formed about an offset and inclined centerline G' while FIGS. 18a, 18b and 20 diagrammatically illustrate the same blade 35 placed in a small body 36b having a slot 39b formed about an offset and inclined centerline H'. For comparison purposes, FIGS. 16a and 16b show the same blade 35 placed in a standard body 36 having a slot formed about the rotational axis A of the body. In all of the aforementioned views, the blade itself has been shown in solid lines and, for purposes of illustration, has been schematically extended so as to wrap around 180°, the extension of the blade being shown by the double-dash lines.

Reference now is made specifically to FIGS. 17a, 17b and 19 which show the large body 36a having a slot 39a formed about an offset and inclined centerline G'. When the slot is formed about the inclined centerline, the offset distance M is reduced from the value that would be selected if the slot centerline were to parallel the axis A as in the case of the parallel centerline G shown in FIG. 14. Accordingly, when forming the slot about the inclined centerline G', the value of M simply is made equal to the difference ($R_c - R_e$) between the radius of the cutting cylinder C' and the radius of the cutting edge so as to make the midpoint 60 of the blade lie directly on the cutting cylinder. Thus, in the specific example given, the offset distance M would be one-eighth inch.

Now, if a blade 35 were placed in a large body 36a with a slot 39a formed about a centerline offset from the axis by a distance M of one-eighth inch but paralleling the axis A, the blade would be located in the body in the position indicated by the dotted lines in FIG. 19, and the cutting edge 50 at the ends 61 of the blade would be located well inwardly of the cutting cylinder C' and would be rendered ineffective for cutting purposes. However, by placing the blade in a slot 39a formed about an inclined centerline G' which is offset from the axis A by the same distance M but which is tilted in a selected direction relative to the axis at a predetermined angle F (FIG. 17b), the cutting edge 50 at the ends 61 of the blade is, in effect, moved outwardly toward the cutting cylinder C' as shown in solid lines in FIG. 19 while the midpoint 60 of the cutting edge remains precisely on the cylinder. By selecting an optimum value for the angle F, the cutting edge can be made to project outwardly from the cylinder C' only a very small distance at the ends 61 of the blade (see FIG. 19) and to project outwardly by progressively decreasing amounts as the edge proceeds from the ends 61 toward the midpoint 60. Accordingly, it is necessary only to grind extremely small amounts of stock from the blade to make the cutting edge 50 conform to the cutting cylinder C' along the entire length of the edge.

The manner of determining the value of the optimum tilt angle F will be explained subsequently. At this point, however, it should be noted that the centerline G' for each slot 39a of the large body 36a is inclined in a positive direction relative to the reference plane containing the axis A and the bisector V of the wrap-around angle T so as to increase the helix angle of the blade 35 with respect to the body. Thus, when a blade with a right hand helix is to be fitted into the slot, the outer end O (FIGS. 17b and 19) of the centerline G' lies to the left of the reference plane while the inner end I of the centerline lies to the right of the plane.

When a slot 39b with an inclined centerline H' (FIGS. 18a, 18b and 20) is to be formed in the small body 36b for the purpose of receiving the blade 35, the offset distance M (FIG. 20) is selected to have the same value as would be the case if the slot centerline were to parallel the axis as shown in FIG. 15. That is, the offset distance is selected to be equal to one-eighth inch or to the difference ($R_e - R_c$) between the radius of the cutting edge 50 and the radius of the cutting cylinder C'' so that the cutting edge at the midpoint 60 of the blade will lie on the cutting cylinder when the blade is placed in the slot 39b. Now, if the centerline were offset but not inclined, the ends 61 of the cutting edge would project a substantial distance outwardly from the cylinder C'' as shown in FIG. 15 and in dotted lines in FIG. 20. By inclining the centerline H' relative to the axis A through an angle F (FIG. 18b) and in a direction opposite the direction of inclination of the centerline G' so as to decrease the helix angle of the blade with respect to the body, the ends 61 of the cutting edge are, in effect pulled inwardly relative to the cutting cylinder C'' as shown in full lines in FIG. 20 and are made to lie much closer to the cylinder while the midpoint 60 of the cutting edge remains precisely on the cylinder. The cutting edge extending between each end 61 and the midpoint 60 also is moved inwardly toward the cutting cylinder and thus the entire cutting edge may be made to lie on the cylinder by grinding a very small amount of stock from the ends 61 and a progressively decreasing amount of stock from the blade as the cutting edge progresses toward the midpoint 60.

E. Determining the Tilt Angle

To explain the manner for determining the optimum tilt angle F, reference is made to FIGS. 17b and 19 in order to establish the coordinates at any point along the cutting edge 50 when the blade 35 is placed in a large body 36a with a slot 39a formed about a centerline G' which is offset from the axis A by a distance M and inclined relative to the axis at an angle F. Now, the X, Y and Z coordinates of any given point e along the cutting edge 50 are measured from the point ($X = 0$, $Y = 0$, $Z = 0$) where a line extending through the midpoint 60 of the cutting edge 50 intersects the axis A at right angles, and the X coordinate $X_e$ may be expressed as follows:

$$X_e = M + R_e \cos(T/2) \qquad (8)$$

where:
$M$ = The offset distance of the centerline G' from the axis A as measured along the bisector V of the angle $T/2$ or in a plane $Y = 0$.
$R_e$ = The radius of the cutting edge 50 as measured from the centerline G'.
$T/2$ = The angle subtended by the cutting edge from the point e to the bisector V as measured from the centerline G'.

And, the Y coordinate $Y_e$ is equal to:

$$Y_e = R_e \sin(T/2) \cos F + (L/2\pi)(T/2) \sin F \qquad (9)$$

where:
$F$ = The angle through which the centerline G' is tilted in a plane $X = M$.
$L$ = The helical lead of the cutting edge.

And, the Z coordinate $Z_e$ is:

$$Z_e = (L/2\pi)(T/2) \cos F \qquad (10)$$

Now, the distance $R_p$ from the axis $A$ to the point $e$ on the cutting edge 50 (as measured in a plane $Z$ = constant) may be expressed as $$R_p = (X_e^2 + Y_e^2)^{1/2} \qquad (11)$$

And, by substituting into equation (11) the values for $X_e$ and $Y_e$ established by equations (8) and (9), equation (11) may be rewritten as;

$$R_p = [(M + R_e \cos(T/2))^2 + (R_e \sin(T/2) \cos F + L/(2\pi) \cdot (T/2) \sin F)^2]^{1/2} \qquad (12)$$

Now, the set out S of the point $e$ from the cutting cylinder C' as measured along a radius $R_c$ extending from the axis A and through the point $e$ may be expressed as:

$$S = R_p - R_c \qquad (13)$$

where $R_c$ = The radius of the cutting cylinder C'.
And, by substituting into equation (13) the value of $R_p$ established in equation (12), the set out S may be expressed as:

$$S = [(M + R_e \cos(T/2))^2 + (R_e \sin(T/2) \cos F + L/(2\pi) \cdot (T/2) \sin F)^2]^{1/2} - R_c \quad (14)$$

Except for the tilt angle F, the value of all of the terms of the right-hand side of equation (14) either are known or can be determined for a given value of the angle T/2. Accordingly, by using a given value of the angle T/2 and by selecting a value for the angle F, equation (14) may be solved to determine the set out S of the cutting edge 50 from the cutting cylinder C' at any point e along the length of the cutting edge as measured in terms of the angle T/2. The several curves in FIG. 21a graphically represent equation (14) with respect to placing the blade 35 in the large body 36a and the curves illustrate how the set out S varies as a function of the angle T/2 for several different values of the tilt angle F. It will be seen from the curve 70 that, when the tilt angle F is zero as a result of the centerline G' paralleling the axis A, the set out S at the ends 61 (represented by T/2 = 45°) of the cutting edge 50 takes on substantial negative values. This means that the ends of the cutting edge are spaced well inwardly from the cutting cylinder C' and that is the condition that would prevail if the blade 35 were in the dotted line position shown in FIG. 19. If the tilt angle F is increased to a value of 1° (as represented by the curve 71), the set out S is made less negative and the ends 61 of the cutting edge more nearly approach the cutting cylinder C'. And, if the tilt angle F is increased to a value of 2.5° (as represented by the curve 73), the set out S at the ends 61 of the cutting edge becomes positive so that the ends actually project considerably beyond the cutting cylinder. By tilting the centerline G' through an angle F of slightly more than 1.5° (see the curve 72), the set out S may be made either zero or just slightly positive along the full length of the cutting edge thereby to set the entire cutting edge on or just outwardly of the cutting cylinder so that, by grinding only a very small amount of stock from the edge, the latter may be made to conform to the cutting cylinder. Accordingly, the optimum tilt angle F is selected to be sufficiently large as to make the offset S either zero or positive along the entire length of the cutting edge and yet sufficiently small as to minimize the positive offset as much as possible to minimize the amount of stock which must be ground from the cutting edge.

Figure 21A:
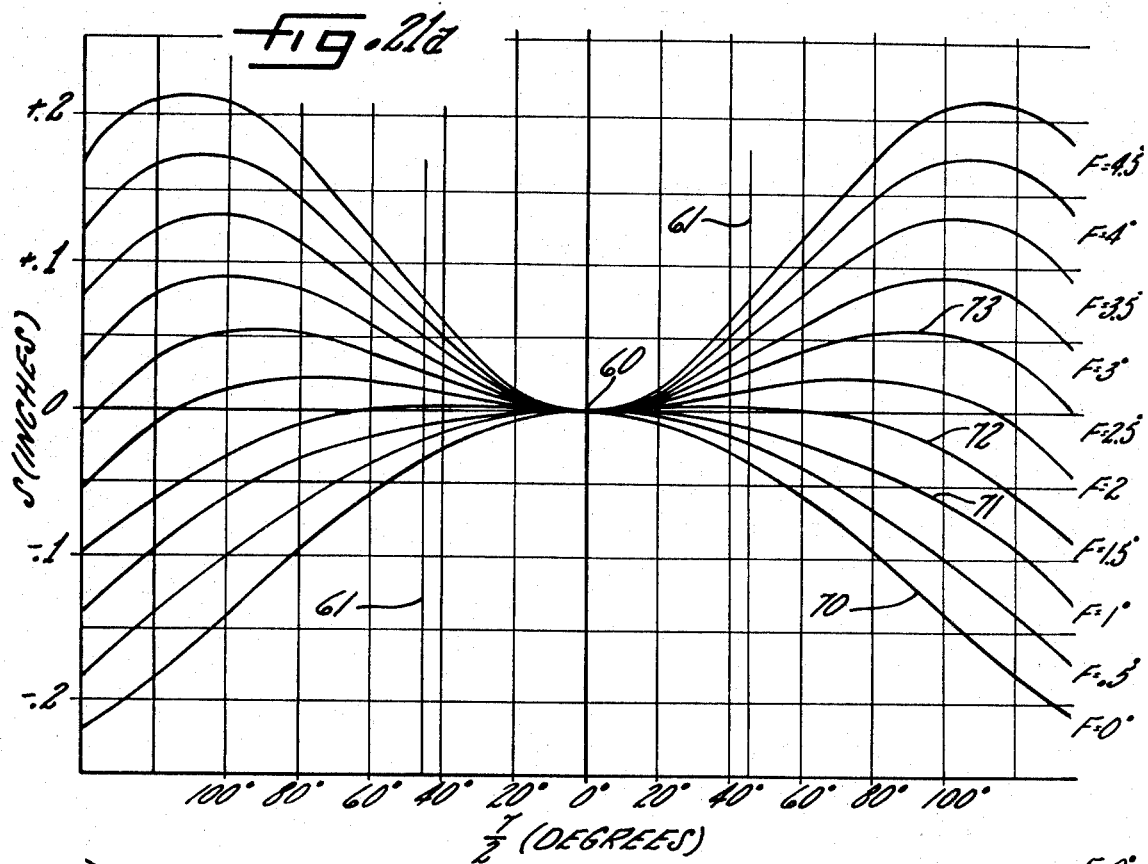
FIG. 21a is a graph having a family of curves illustrating the set out of the cutting edges of the blades when the latter are placed in large cutter bodies whose slots are formed about offset centerlines which are inclined at various different angles.
Figure 21B:
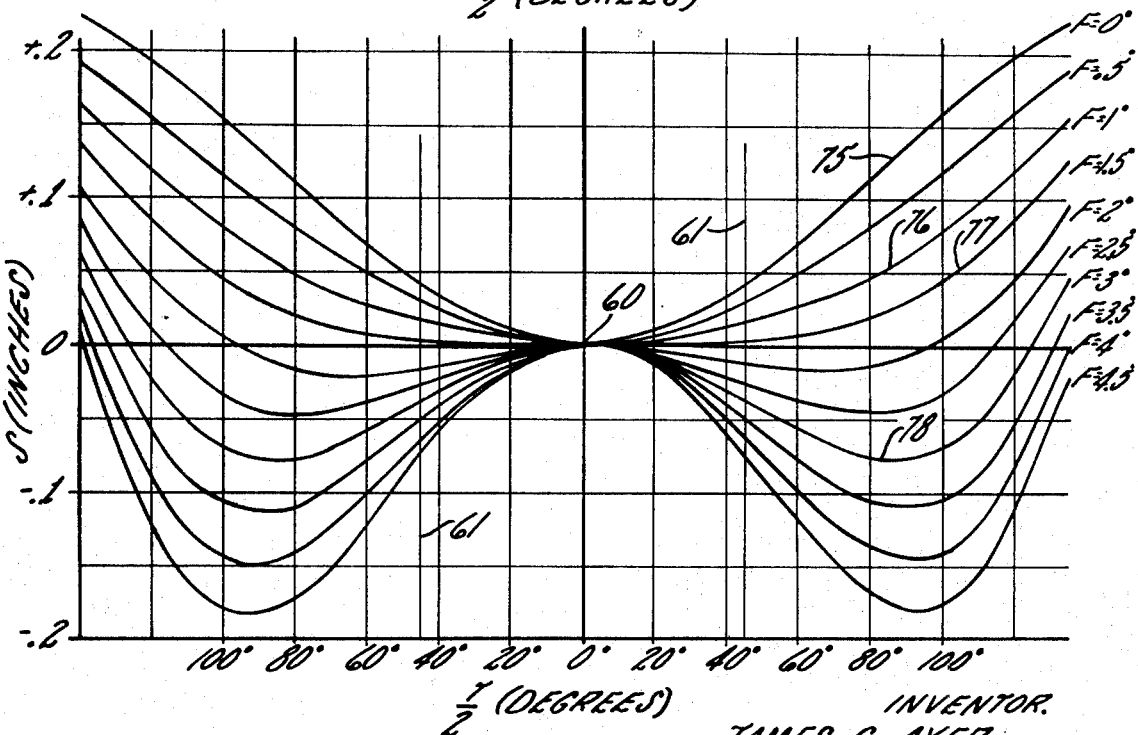
FIG. 21b is a graph similar to FIG. 21a but having a family of curves illustrating the set out of the cutting edges of the blades when the latter are placed in small cutter bodies whose slots are formed about offset centerlines which are inclined at various different angles.

The several curves shown in FIG. 21b correspond generally to those shown in FIG. 21a but graphically represent equation (14) with respect to placing the blade 35 in the small body 36b (as shown in FIG. 20) where the value of M is negative and the radius $R_c$ of the cutting cylinder C'' is reduced. As shown by the curve 75 in FIG. 21b, the set out S at the ends 61 of the blade takes on substantial positive values if the tilt angle F is zero, and the ends of the cutting edge project a substantial distance outwardly from the cutting cylinder C'' as shown in dotted lines in FIG. 20. As shown by the curves 76 and 78, the set out S at the ends 61 becomes less positive if the tilt angle is increased to 1° and becomes negative if the tilt angle is increased to 3°. By selecting an optimum tilt angle F slightly less than 1.5° as shown by the curve 77, the set out S along the entire length of the cutting edge can be made either zero or just slightly positive thereby to locate the full cutting edge on beyond the cutting cylinder C'' while minimizing the amount of stock needed to be removed to make the cutting edge conform to the cutting cylinder.

To summarize, offsetting of the centerlines of the slots enables the blades 35 to be used in conjunction with bodies of different diameters while keeping the serrations 53 on the blades in mating engagement with the serrations 43 in the slots. Tilting of the centerlines produces the additional advantage of reducing the amount of stock which must be ground from the cutting edge to make the full length of the edge lie on the cutting cylinder. Thus, in carrying out the present invention, the location of the centerline of each slot always coincides with the centerline B of the associated blade and preferably is established so as to make the cutting edge approximate the cutting cylinder as closely as possible. To form the slots about the offset centerlines or the offset and inclined centerlines, the cutter body may be rotated about the particular centerline (rather than about the rotational axis A) while a milling cutter is moved along the body parallel to the axis. Alternatively, the cutter body may be rotated about the axis A and the slots may be cut by a milling cutter mounted on the spindle of a five-axis milling machine which is programmed to move the milling cutter relative the body with the same relative movements that would result in forming the slots by the first-described method.

F. Progressive Set Out of the Helical Blades

When the blades 35 of a helical cutter wear inwardly away from the cutting cylinder during service use, each blade often is taken out of one slot in the body and is placed in an adjacent slot which is arranged to locate the blade a greater distance outwardly from the rotational axis A so that, by regrinding and resharpening the cutting edge 50, the latter can be made to again lie on the cutting cylinder and can be used for further cutting. Thus, the slots are arranged so that each blade can be indexed from slot to slot and the cutting edge will be set out progressively greater distances from the cutting cylinder each time the blade is indexed.

Although offsetting of the centerlines of the slots is particularly advantageous in enabling the use of blades 35 of a given diameter with a cutter body of a different diameter, such offsetting also makes it possible to index the blades of a given body from slot to slot for the purpose of progressively setting out the cutting edges 50 and, importantly, to maintain the serrations 53 on each blade in precise mating relationship with the serrations 43 of every slot in which the blade is placed. Thus, in accordance with another feature of the present invention, the slots are arranged to eliminate the mismatch normally occurring between the serrations of the blades and the slots of prior cutters when each blade is placed in a different slot to set out the cutting edge.

In order to explain the foregoing in more detail, reference is made to FIG. 22 which diagrammatically shows a large cutter body 36a whose slots 39a are curved about centerlines G'' which are both offset and inclined relative to the axis A of the body to enable optimum use of the body with the blades 35. Now, to enable the cutting edge 50 of each blade to be set out progressively greater distances as the blade is indexed from slot to slot around the body 36a, the centerline G'' of a first slot (slot No. 1) is offset from the axis a distance M which simply is equal to the difference $R_c - R_e$ between the blade and the cutting cylinder. The centerline of a second and adjacent slot (slot No. 2), however, is offset an additional distance N which is sufficient to locate the innermost groove 44 in slot No. 2 outwardly of the innermost groove 44 in slot No. 1 by a distance of, for example, 0.020 inch. The centerline of the next or third slot (slot No. 3) is offset a distance equal to M + 2N while the centerline of the fourth slot (slot No. 4) is offset a distance equal to M + 3N.

Accordingly, when a blade 35 initially located in slot No. 1 (FIG. 22) is placed in slot No. 2, the cutting edge 50 will be located 0.020 inch further outwardly from the cutting cylinder C'. If the same blade is then placed in slot No. 3, the cutting edge will be set out another 0.020 inch from the cutting cylinder and, if the blade is subsequently placed in slot No. 4, the cutting edge will be set out still another 0.020 inch. In each case, however, the serrations 53 on the blade will match precisely with the serrations 43 in the slots because the centerline B of the blade coincides exactly with the centerline G'' of each slot when the blade is seated in the slot and because each corresponding serration on the blade and the slot are curved about the common centerline and on the same radius.

In using a cutter whose blades 35 are adapted to be set out progressively upon being indexed from slot to slot, the cutting edge 50 of each blade initially is ground to lie on the cutting cylinder. Then, as the blades wear away and are reground, the blade in slot No. 1 is moved to slot No. 2, the blade in slot No. 2 is moved to slot No. 3 and the blade in slot No. 3 is moved to slot No. 4. The blade in slot No. 4 is discarded, and a new blade is placed in slot No. 1. In this way, each new blade placed in slot No. 1 may be reground and re-used three additional times in the other slots before being discarded. Because, however, of the particular location of the centerlines of the slots, a precise match is obtained between the serrations 53 of the blade and the serrations 43 of each slot.

The principles of the invention also can be used to advantage to obtain progressive set out of the blades 35 when the latter are used in conjunction with the standard sized cutter body 36 with which the blades are specifically matched. One way of obtaining progressive set out of the blades when used with the standard body 36 is to form a first slot 39 (slot No. 1) in the body 36 about a centerline J (see FIG. 23) which parallels the axis and which is offset inwardly from the axis by a predetermined distance N (such as 0.020 inch) in a negative direction away from the side of the body in which the slot is formed. The adjacent or second slot (slot No. 2) then is actually formed about a centerline which coincides with the axis A so that slot No. 2 is offset outwardly from slot No. 1 by the distance N. To advantage, the third slot (slot No. 3) is formed about the same centerline J as slot No. 1 and thus is offset outwardly from slot No. 2 by the same distance N and is offset outwardly in a positive direction from the axis A. The fourth slot (slot No. 4) is formed about a parallel centerline K which is offset from the axis A by a positive distance of 2N and, as a result, is offset outwardly from slot No. 3 by a distance N. Accordingly, each slot is offset from its preceding slot by an equal distance so that the blades 35 may be indexed from slot to slot and set out progressively greater distances from the axis A. By forming slot No. 2 about the rotational axis A, the cutting edge 50 of the blade in the second slot matches the radius of the cutting cylinder C and thus there is no variation in grinding stock from the midpoint to the ends of the blade placed in the slot No. 2. Because slot No. 3 is formed about the same centerline J as slot No. 1, the centerline of slot No. 3 is offset from the axis by only a distance N rather than by a distance 2N. Also, formation of slot No. 1 and slot No. 3 about the common centerline J enables the centerline K of slot No. 4 to be offset from the axis A by only a distance 2N instead of by a distance 3N. Accordingly, the variation in the grinding stock between the midpoint and the ends of the blades placed in slots Nos. 3 and 4 is small as compared to the variation which would exist if the centerlines of those slots were offset from the axis A by distances equal to 2N and 3N, respectively. Of course, the variation in grinding stock may be reduced still further by inclining the centerlines and, in such a case, the centerlines of slots Nos. 1 and 3 would be non-coincident.

G. Attaching the Helical Blades With Screws

A further feature of the invention resides in the unique attachment of the helical blades 35 to the various cutter bodies with comparatively simple securing means in the form of threaded fasteners such as screws 80 (FIG. 1) which positively hold the blades in fixed longitudinal positions as well as fixed transaxial positions. The use of the screws will be explained specifically in conjunction with the standard cutter body 36 (FIGS. 1 to 8) but it should be understood that the same principles apply to the large and small bodies 36a and 36b.

In this instance, four equally spaced screws 80 are used to hold each blade 35, and each screw extends through a hole 82 (FIGS. 5 to 8) formed through the adjacent flute 38 and is threaded into a concentric hole 84 (FIG. 10) formed through the holder 46 of the blade. The axis 86 (FIG. 8) of each of the four longitudinally spaced pairs of holes 82 and 84 intersects a single imaginary helical line 88 (FIGS. 5 and 7) extending along the serrated side wall of the slot 39 and located between the side wall and the trailing side of the blade. In addition, the axis 86 of each pair of holes 82 and 84 extends at substantially right angles in all planes to a plane of infinitesimally small area containing the side wall of the slot and located at the point of intersection of the axis 86 with the side wall (see FIG. 8). With the screw holes located in this manner, each blade can be drawn into snug engagement with the side wall of the associated slot and, through the use of the screws, replacement and indexing of the blades can be accomplished quickly and easily. Also, the screws positively prevent the blade from shifting longitudinally of the body 36 and coact with the serrations 43 and 53 to hold the blade in a fixed transaxial position.

In order that each of the blades 35 can be used in each of the slots irrespective of the location of the centerline of the slot, the screw holes 84 in the blade are located such that the imaginary helical line 88 which connects the axes 86 of the screw holes is curved on a selected radius and is curved about the centerline B of the blade. The screw holes 82 through the side wall of any slot are located such that the corresponding helical line which connects the axes 86 of the screw holes 82 is curved on an identical radius and is curved about the centerline of that particular slot. Accordingly, when the blade is seated properly in any slot with the innermost rib 54 on the blade fitted into the innermost groove 44 in the slot, the screw holes 84 in the blade will match with the screw holes 82 in the slot regardless of whether the slot is curved about the rotational axis A of the body or about a centerline which is non-coincident with the rotational axis.

A further advantage resulting from the use of the screws 80 is that the screw holes 82 can be located to set the outer end of each blade 35 progressively greater distances outwardly from the outer end of the body by indexing the blade from slot to slot. As shown in FIGS. 1 and 9, each blade includes an end cutting edge 90 which coacts with the main cutting edge 50 to remove the metal of the workpiece. The end cutting edge 90 is formed in part by the end edge of the carbide tip 47 and in part by the end edge of an additional tip 92 which is brazed to the outer end portion of the holder 46 at a location disposed inwardly of the main tip. During service use, the end cutting edge 90 wears away in the same fashion as the main cutting edge and must be reground. The screw holes 82 may be located such that the blade is set out progressively greater distances from the outer end of the body each time the blade is indexed to another slot and thus, after the end cutting edge 90 is reground and the blade is indexed, the end cutting edge may be located the same distance outwardly from the outer end of the body.

More specifically, the outermost screw hole 82 in a first one of the flutes 38 is spaced inwardly a selected distance D (FIG. 7) from the outer end of the body. The outermost screw hole 82 in a second or adjacent flute is located closer to the outer end of the body by a distance E such as 0.030 inch. The outermost screw holes 82 in the third and fourth flutes are spaced inwardly from the outer end of the body by distances D-2E and D-3E, respectively. Accordingly, the four screw holes 82 in each flute are staggered longitudinally with respect to the four screw holes in the adjacent flute thereby to cause the blade to be set out different distances from the end of the body each time the blade is indexed from slot to slot. In those cases where two blades are disposed end-to-end in each slot, staggering of the screw holes 82 produces the additional advantage of staggering any gaps between the adjoining ends of the blades in adjacent slots so that any metal left uncut as a result of the gap between one pair of blades is cut away by the succeeding pair of blades.

I claim as my invention:

1. A cutter having a generally cylindrical body rotatable about an axis extending longitudinally through the center of the body, a slot opening out of the peripheral surface of said body and curved helically around and along a longitudinally extending centerline which at every point is non-coincident with said axis, and a cutting blade seated against a wall of said slot and curved helically around and along a centerline which coincides with the centerline of the slot.

2. A cutter as defined in claim 1 in which the centerline of said slot is offset radially from and extends parallel to said axis.

3. A cutter as defined in claim 1 in which the centerline of said slot is offset from and inclined relative to said axis, the axis and the centerline of the slot lying in parallel planes.

4. A cutter as defined in claim 3 in which the bisector of the angle subtended by said blade intersects the centerline of said slot at right angles.

5. A cutter as defined in claim 1 further including a first pair of concentric holes formed in said wall and the adjacent side of said blade, a second pair of concentric holes formed in said wall and the adjacent side of the blade and spaced longitudinally along said body from said first pair, each pair of holes having an axis extending substantially perpendicular to said wall and to the side of the blade at the point of intersection of such axis with the wall and the side of the blade, the axes of both pairs of holes intersecting a single imaginary line extending between said wall and the side of the blade and curving helically around and about the centerline of said slot, and a threaded fastener located within each pair of holes and detachably connecting said blade to said body.

6. A cutter having a generally cylindrical body rotatable about an axis extending longitudinally through the center of said body, a slot formed in said body and opening out of the peripheral surface thereof, a helical cutting blade fitted into said slot and secured to said body, said blade having a helical surface for locating the blade in a predetermined position in said slot, and a locating seat within said slot in engagement with said locating surface and curved helically about a centerline which at every point is non-coincident with said axis.

7. A cutter as defined in claim 6 in which said locating surface comprises a series of concentric serrations spaced equally from one another across one side of said blade and curved helically about said centerline, said seat comprising a second series of concentric serrations spaced equally from one another across one wall of said slot and meshing with the serrations on said blade to locate the latter in a predetermined transaxial position relative to said body.

8. A cutter having a generally cylindrical body rotatable about an axis extending longitudinally through the center of said body, a plurality of angularly spaced slots formed in said body and opening out of the peripheral surface thereof, at least one helical cutting blade fitted into each slot and secured to said body, each of said blades having a helically curved surface for locating the blade in a predetermined transaxial position in its slot, and a locating seat within each slot and disposed in engagement with said locating surface, the locating seat in at least one slot being curved helically about a centerline which is non-coincident with said axis.

9. A cutter having a generally cylindrical body rotatable about an axis extending longitudinally through the center of said body, a plurality of angularly spaced slots formed in said body and opening out of the peripheral surface thereof, a cutting blade fitted into each slot and secured to said body, a helically curved locator on one side of each of said blades, a complementary seat on the adjacent wall of each slot and engaging the locator on the respective blade to hold the latter in a predetermined transaxial position in said slot, and the seat in each slot being concentric with the locator on the respective blade and being curved helically about a centerline inclined relative to said axis and disposed in a plane spaced radially from and paralleling said axis whereby blades having locators curved helically about a given centerline and on a radius different than the transaxial spacing between said seats and said axis may be fitted into said slots with the locators disposed concentrically with said seats and engaging the latter face-to-face.

10. A cutter having a generally cylindrical body rotatable about an axis extending longitudinally through the center of said body, a plurality of angularly spaced slots formed in said body and opening out of the peripheral surface thereof, helical cutting blades fitted into said slots and secured detachably to said body with the cutting edge of each blade projecting beyond the peripheral surface of the body, a helically curved locator on one side of each of said blades, a complementary helically curved seat on the adjacent wall of each slot and concentrically engaging the locator on the respective blade to hold the latter in a predetermined transaxial position in said slot, and the seat of at least one slot being curved helically about a centerline offset from said axis and being spaced a different distance from said axis than the corresponding seat of the adjacent slot whereby the blade in said one slot may be indexed to and fitted in the adjacent slot to set the cutting edge of such blade a different distance from said peripheral surface while maintaining face-to-face concentric engagement between the locator of the blade and the seat of the slot receiving the blade.

11. A cutter as defined in claim 10 in which said body includes at least three angularly spaced slots each fitted with a blade, the centerline of the seat of a first one of a pair of said slots being offset from said axis a distance equal to twice the offset between said axis and the centerline of the seat of a second one of said pair of slots.

12. A cutter as defined in claim 10 in which said body includes four angularly spaced slots, the centerline of the seat of a first one of said slots coinciding with said axis, the centerlines of the seats of the two slots adjacent said first slot coinciding with one another and being offset radially from said axis by a predetermined distance, and the centerline of the seat of the fourth slot being offset radially from said axis by a distance equal to twice said predetermined distance.

13. A cutter as defined in claim 10 in which each of said locators comprises a series of serrations extending helically along said one side of said blade and disposed concentrically with and spaced equally from one another across said side, each of said seats comprising a second series of serrations extending helically along said side wall of said slot, each of said second series of serrations being disposed concentrically with and spaced equally from one another across said side wall and meshing with the serrations on the respective blade without any mismatch between the two series of serrations irrespective of the indexed position of the blade.

14. A cutter having a generally cylindrical body rotatable about an axis extending longitudinally through the center of said body, a plurality of angularly spaced slots formed in said body and opening out of the peripheral surface thereof, helical cutting blades fitted into said slots and secured detachably to said body with the cutting edge of each blade projecting beyond the peripheral surface of the body, one side of each blade being formed with a series of helically extending serrations concentric with and spaced equally from one another across said side, each slot having a side wall formed with a series of serrations spaced equally from one another across said wall and meshing with the serrations on the respective blade to locate the blade in a predetermined transaxial position in said slot, each serration on said slot wall being formed on the same radius as the mating serration on said blade and being curved helically about a centerline offset from and inclined relative to said axis, and the centerlines of the serrations of each slot being offset a different distance from said axis whereby a blade fitted into said slot and curved helically about a centerline other than said axis may be seated against said wall without mismatch between the serrations on the blade and the serrations on the wall and may be indexed to and fitted in another slot to set said cutting edge a different distance from said peripheral surface and without mismatch between the serrations.

15. A cutter having a generally cylindrical body rotatable about an axis extending longitudinally through the center of the body, a plurality of angularly spaced slots formed in said body and opening out of the peripheral surface thereof, each of said slots having a helical side wall, a cutting blade fitted into each slot and having a helical side engaging said side wall substantially face-to-face, a first pair of concentric holes formed in each side wall and the side of the respective blade, a second pair of concentric holes formed in each side wall and the side of the respective blade and spaced longitudinally along said body from said first pair, each pair of holes having an axis extending substantially perpendicular to said side wall and to the side of the blade in all planes at the point of intersection of such axis with the side wall and the side of the blade, the axes of both pairs of holes intersecting an imaginary helical line extending along said side wall and the adjacent side of the respective blade, and threaded fasteners located within said holes and detachably connecting said blades to said body.

16. A cutter as defined in claim 15 in which the imaginary helical lines intersecting the axes of the screw holes and extending along the side walls of adjacent slots are curved on the same radius but about non-coincident centerlines.

17. A cutter as defined in claim 16 in which one of said centerlines coincides with the rotational axis of said body.

18. A cutter as defined in claim 16 in which one of said centerlines is offset transaxially from the rotational axis of said body.

19. A cutter as defined in claim 18 in which said one centerline is also inclined relative to the rotational axis of said body.

20. A cutter as defined in claim 15 in which corresponding holes in adjacent slots are longitudinally staggered relative to one another.

21. A cutter having a generally cylindrical body rotatable about an axis extending longitudinally through the center of the body, a plurality of angularly spaced slots formed in said body and opening out of the peripheral surface thereof, each of said slots having a helical side wall, a cutting blade fitted into each slot and having a helical side engaging said wall substantially face-to-face, first and second longitudinally spaced pairs of concentric holes formed in each side wall and the side of the adjacent blade, and threaded fasteners located within said holes and detachably connecting said blades to said body.

22. A cutter as defined in claim 21 in which the holes in one of said slots are staggered longitudinally relative to and offset transaxially from the holes in an adjacent slot.

* * * * *